UNITED STATES PATENT OFFICE.

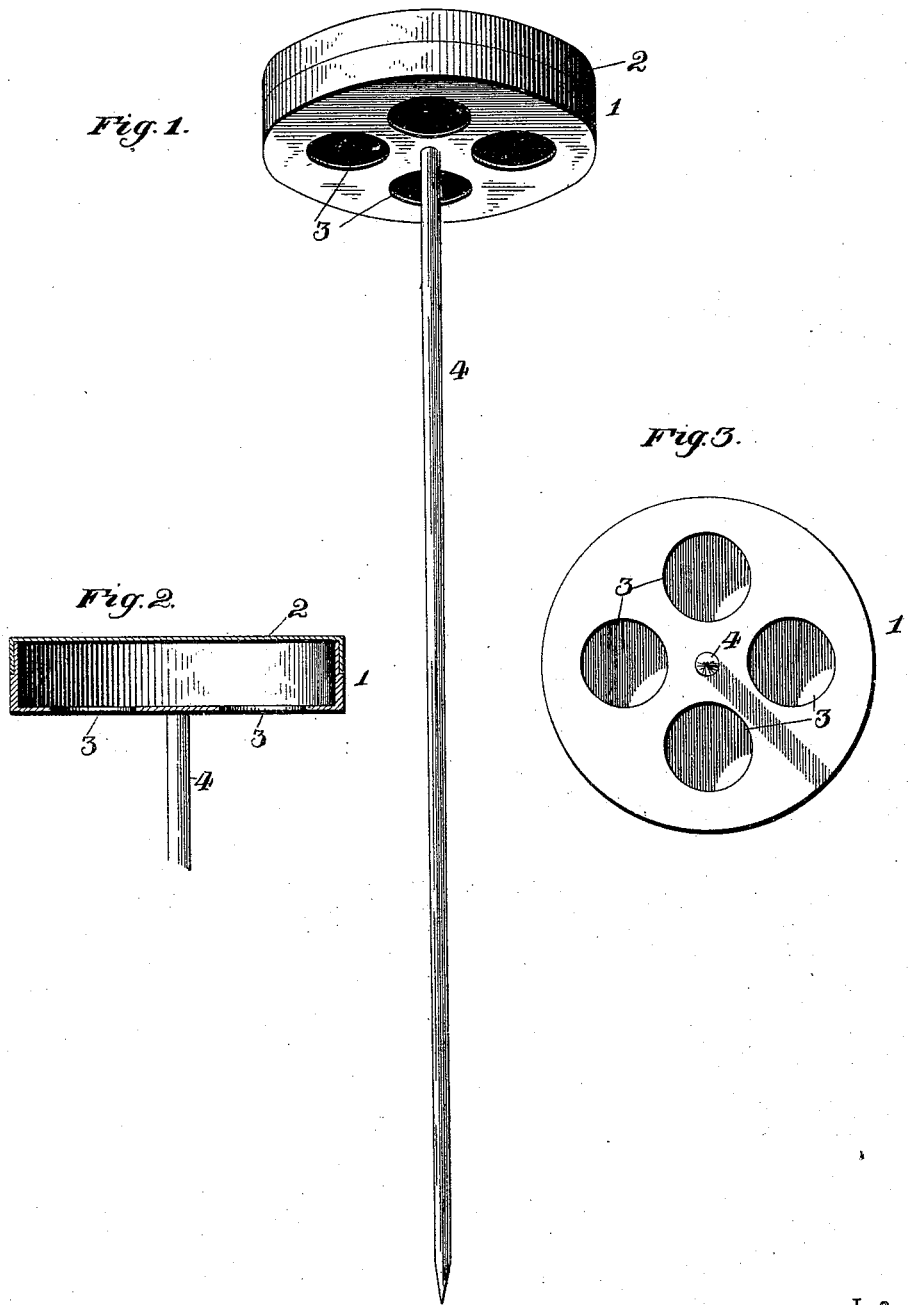

ALLEN L. DE SHON, OF STEELE, NORTH DAKOTA.

POISON-RECEPTACLE.

SPECIFICATION forming part of Letters Patent No. 478,691, dated July 12, 1892.

Application filed January 12, 1892. Serial No. 417,870. (No model.)

*To all whom it may concern:*

Be it known that I, ALLEN L. DE SHON, a citizen of the United States, residing at Steele, in the county of Kidder and State of North Dakota, have invented a new and useful Poison-Receptacle, of which the following is a specification.

The invention relates to improvements in poison-receptacles.

The object of the present invention is to provide a simple and inexpensive poison-receptacle which will be adapted to hold poison in convenient position to attract gophers, rats, and similar burrowing animals, and which will keep the poison out of the reach of stock, and which will protect the poison from the weather.

The invention consists in the construction and novel combination and arrangement of parts hereinafter fully described, illustrated in the accompanying drawings, and pointed out in the claim hereto appended.

In the drawings, Figure 1 is a perspective view of a poison-receptacle constructed in accordance with this invention. Fig. 2 is a vertical sectional view. Fig. 3 is a reverse plan view.

Like numerals of reference indicate corresponding parts in all the figures of the drawings.

1 designates a circular receptacle having a removable lid 2 and adapted to contain a cake of poison and provided in its bottom with circular openings 3, through which access may be had to the poison by gophers, rats, and the like. The receptacle is centrally mounted on a spindle 4 and is designed to be arranged about six inches above the ground, and the spindle 4 may be inserted in the ground near the hole of a gopher or other convenient point. It will be impossible for a gopher to carry off an entire cake of poison, but after eating it will leave the remainder in the receptacle for other animals, whereby the poison is economically distributed. After a cake of poison has been entirely eaten another one may be readily placed in the receptacle. By arranging the poison in a receptacle which is provided with openings in the bottom and which is arranged above the ground the poison is within convenient reach and is adapted to attract the animals to be exterminated, and it is out of the reach of stock. The poison is not exposed to the atmosphere or rain, and consequently will not lose its strength, as it would even if it were placed on the ground.

The upper end of the supporting-spindle is secured to the bottom of the receptacle by soldering or by any other suitable means.

What I claim is—

A poison-receptacle comprising a cylindrical box adapted to contain a cake of poison and provided in its bottom with openings through which the poison may be eaten, but which prevents the entire cake being taken from the receptacle at once, and a depending pointed stem or spindle having its upper end secured to the bottom of the box and having its lower end adapted to be inserted in the ground to support the box a short distance above the same, substantially as described.

In testimony that I claim the foregoing as my own I have hereto affixed my signature in the presence of two witnesses.

ALLEN L. DE SHON.

Witnesses:
 E. S. CARR,
 J. W. GUNSALLAS.